US008186407B2

(12) United States Patent
Arena

(10) Patent No.: US 8,186,407 B2
(45) Date of Patent: May 29, 2012

(54) LABELLING MACHINE

(75) Inventor: Giorgio Arena, Frosinone (IT)

(73) Assignee: Open Data S.r.l., Frosinone (IT)

( * ) Notice: Subject to any disclaimer, the term of this patent is extended or adjusted under 35 U.S.C. 154(b) by 220 days.

(21) Appl. No.: 12/713,387

(22) Filed: Feb. 26, 2010

(65) Prior Publication Data

US 2011/0079358 A1 Apr. 7, 2011

(30) Foreign Application Priority Data

Oct. 6, 2009 (IT) ............................ RM2009A0509

(51) Int. Cl.

*B65C 11/02* (2006.01)
*B65C 9/46* (2006.01)
*B29C 65/48* (2006.01)
*B32B 37/00* (2006.01)
*B32B 41/00* (2006.01)

(52) U.S. Cl. ........ 156/384; 156/387; 156/577; 156/579; 156/DIG. 48; 156/DIG. 49

(58) Field of Classification Search .......... 156/384–388, 156/577, 579, DIG. 48, DIG. 49; 101/94, 101/110, 111, 288–295, 324
See application file for complete search history.

(56) References Cited

U.S. PATENT DOCUMENTS 3,231,446 A * 1/1966 Satas ............................ 156/384
3,342,662 A * 9/1967 Grasmann ..................... 156/384
3,551,251 A * 12/1970 Kazunosuke et al. ........ 156/384
3,582,433 A * 6/1971 Rothenberger ............... 156/384
3,611,929 A * 10/1971 Schrotz et al. ............... 101/362
3,656,430 A * 4/1972 Olsson .......................... 101/288
3,686,055 A 8/1972 Hermann
3,705,833 A * 12/1972 Wada ............................ 156/384
3,782,279 A * 1/1974 Carboni et al. ............... 101/288
3,800,701 A * 4/1974 Martin .......................... 101/288
3,852,139 A * 12/1974 Jenkins ......................... 156/250
3,890,188 A * 6/1975 Sams ............................ 156/384
3,923,582 A * 12/1975 Schroter et al. ............... 156/368

(Continued)

FOREIGN PATENT DOCUMENTS

DE 1909900 A1 5/1971

OTHER PUBLICATIONS

Italian Search Report in Corresponding Application No. IT RM20090509 Dated Jun. 1, 2010.

*Primary Examiner* — Sing P Chan
(74) *Attorney, Agent, or Firm* — Young & Thompson

(57) ABSTRACT

A labeling machine includes a device for adjusting the position of a tape holding labels, which enables moving the tape progressively on an abutment surface in order to vary the position of the print on the label. The labeling machine further presents a self-regulating arresting element of a tape bearing labels. The arresting element presses the tape against an abutment surface when a label must be applied on a destination surface and releases the tape when, on the action of a control device, the tape is actuated to advance. The machine further includes a printing member whose ink roller is associated to a device that enables it to engage easily and smoothly on a corresponding support arm. The support arm is connected to a door providing access to interior areas of the labeling machine, whose opening causes the support arm to exit and the exposes the ink roller.

20 Claims, 8 Drawing Sheets

U.S. PATENT DOCUMENTS 3,934,507 A * 1/1976 Geri .............................. 101/291
3,957,562 A * 5/1976 Hamisch, Jr. ................. 156/384
4,008,119 A 2/1977 Hermann
4,011,813 A * 3/1977 Sams ............................ 101/288
4,026,758 A * 5/1977 Sato .............................. 156/540
4,041,863 A * 8/1977 Mullen et al. ................. 101/269
4,051,780 A * 10/1977 Sato .............................. 101/305
4,075,944 A * 2/1978 Conley ............................ 101/94
4,091,728 A * 5/1978 Sato .............................. 101/288
4,111,736 A * 9/1978 Hamisch, Jr. ................. 156/384
4,131,504 A * 12/1978 Furutu .......................... 156/384
4,166,757 A * 9/1979 Hamisch, Jr. ................. 156/384
4,176,603 A * 12/1979 Sato .............................. 101/291
4,213,389 A * 7/1980 Sato .............................. 101/295
4,257,326 A * 3/1981 Sato .............................. 101/288
4,308,797 A * 1/1982 Becker et al. ................. 101/292
4,377,435 A * 3/1983 Fujita ............................ 156/384
4,384,525 A * 5/1983 Sato et al. ..................... 101/288
4,406,727 A * 9/1983 Fujita ............................ 156/384
4,451,323 A * 5/1984 Sato et al. ..................... 156/541
4,452,667 A * 6/1984 Chang ........................... 156/384
4,453,999 A * 6/1984 Holland-Letz ................ 156/361
4,498,389 A * 2/1985 Hamisch, Jr. ................. 101/288
4,518,454 A * 5/1985 Fujita ............................ 156/541
4,544,433 A * 10/1985 Schrotz et al. ................ 156/384
4,560,087 A * 12/1985 Sato et al. ........................ 221/73
4,699,685 A * 10/1987 Sato .............................. 156/384
4,985,110 A * 1/1991 Becker .......................... 156/540
5,013,390 A * 5/1991 Hermann ...................... 156/577
5,045,145 A * 9/1991 Becker .......................... 156/384
5,254,206 A * 10/1993 Wing ............................ 156/542
5,900,108 A * 5/1999 Sekine .......................... 156/384

* cited by examiner

LABELLING MACHINE

BACKGROUND OF THE INVENTION

The present invention relates to a labeling machine.

In particular, the present invention relates to a manually operated labeling machine for the application of labels bearing one or more captions, e.g. indications about the products whereon the label is applied. In greater detail, the present invention is suitable for use in warehouses and/or in any commercial activity, such as department stores, supermarkets, shops and/or the like in which there is a need to affix various types of commercial and/or informational indications.

As is well known, there are manually operated labeling machines that comprise a load-bearing structure, within which is provided a device for feeding a label-holder tape. The label-holder tape is guided within the load-bearing structure to an area of application of the labels, whereat each label borne by the tape is detached from it to be affixed on a respective surface of the product of interest.

To allow the advance of the label holder tape within the load-bearing structure, known labeling machines are provided with an appropriate actuating device which pulls the tape downstream of the application area, making it advance towards an area of discharge of the tape without the labels.

Such labeling machines are also provided with a member for arresting and/or braking the tape to allow the application of each label without the occurrence of undesired dragging of the tape. In particular, prior art labeling machines are provided, between the tape feeding member and the area of application of the labels, with a series of mechanism that continuously press the label-holder tape against an abutment surface present within the load-bearing structure. In this way, the label-holder tape is maintained in a fixed position allowing the complete detachment of the label to be applied.

Known labeling machines further comprise a control device, usually constituted by a movable element which has an appropriate grip, operatively connected to the actuation device to bring, to the application area, consecutively to each other, the labels borne by the tape. In particular, when the control device is operated manually, the cooperation between the latter and the actuation device intensely drive the label holder tape which, overcoming the blocking forces exercised by the arresting device, advances as described above.

Within the structure is also provided a printing element able to deposit on each label, upstream of the application area, a predefined quantity of ink according to pre-set motifs, whereby the aforementioned commercial and/or informational indications are obtained.

To allow correctly to print the aforesaid motifs on each label, a device is also provided for adjusting the position of the tape relative to the printing element.

Considering that labeling machines can be used with tapes of variable format and therefore with labels having different pitch (distance between two successive labels) and dimensions, it is essential to be able to modify the position of the tape, in order to assure that each print is correctly impressed on each label. The adjusting device is generally constituted by a movable slide, positioned at the area of application of the labels, and provided with a tape transmission roller. The slide is movable within a sliding guide to vary the distance between the transmission roller and the application area, thus modifying the path of the tape.

The adjusting device further presents a tightening screw, able to lock the slide in the desired position.

Generally, the tightening screw is positioned externally in view, to enable manual interventions thereon without having to open the body of the structure. In this way, when the operator has to intervene on the slide, the screw is loosened to allow to change the positioning of the roller and consequently to adjust the labels relative to the printing element. Once the correct position is found, the screw is tightened, locking the entire slide and the respective transmission roller in position.

Although prior art labeling machines do enable the printing and satisfactory application of labels on the packages and/or surfaces of the products of interest, the Applicant has observed that they are not free of some drawbacks, mainly in relation to the use of the device for adjusting the positioning of the tape.

In particular, a first drawback is that the tightening screw is generally positioned along the path of the tape downstream of the area of application of the labels. Therefore, the screw is obscured and not immediately visible by the user.

It should also be considered that the tightening screw is difficult to operate, because of the presence of the tape which obscures the screw itself.

Consequently, action on the screw, in addition to being inconvenient, entails the partial breakage of the tape downstream of the area of application of the labels, which tape must be moved aside to uncover the screw itself.

An additional drawback is given by the difficulty in adjusting the device, due to the manual actuation of the slide along the aforementioned sliding guide. Therefore, any manual errors in adjusting the slide cause the erroneous positioning between print and pre-print or even printing on two contiguous labels.

SUMMARY OF THE INVENTION

An essential object of the present invention, therefore, is to overcome the drawbacks of the prior art.

In particular, an object of the present invention is to make available a labeling machine that is provided with a system for adjusting the position of the tape that is readily accessible by the user, without acting on the tape.

An additional object of the present invention is to make available a labeling machine that is provided with a system for adjusting the position of the tape that is easy to use and at the same time is able to assure the correct positioning of the labels relative to the printing element.

The technical task set out above and the specified objects are substantially achieved by a labeling machine comprising the characteristics described and claimed below.

BRIEF DESCRIPTION OF THE DRAWINGS

Further characteristics and advantages shall become more readily apparent from the detailed description of a preferred, but not exclusive, embodiment of a labeling machine, in accordance with the present invention. Said description shall be provided below with reference to the accompanying figures, provided purely by way of non limiting indication, in which.

DESCRIPTION OF THE PREFERRED EMBODIMENTS

With reference to the accompanying figures, the number 1 globally indicates a labeling machine, in accordance with the present invention.

Figure 1:
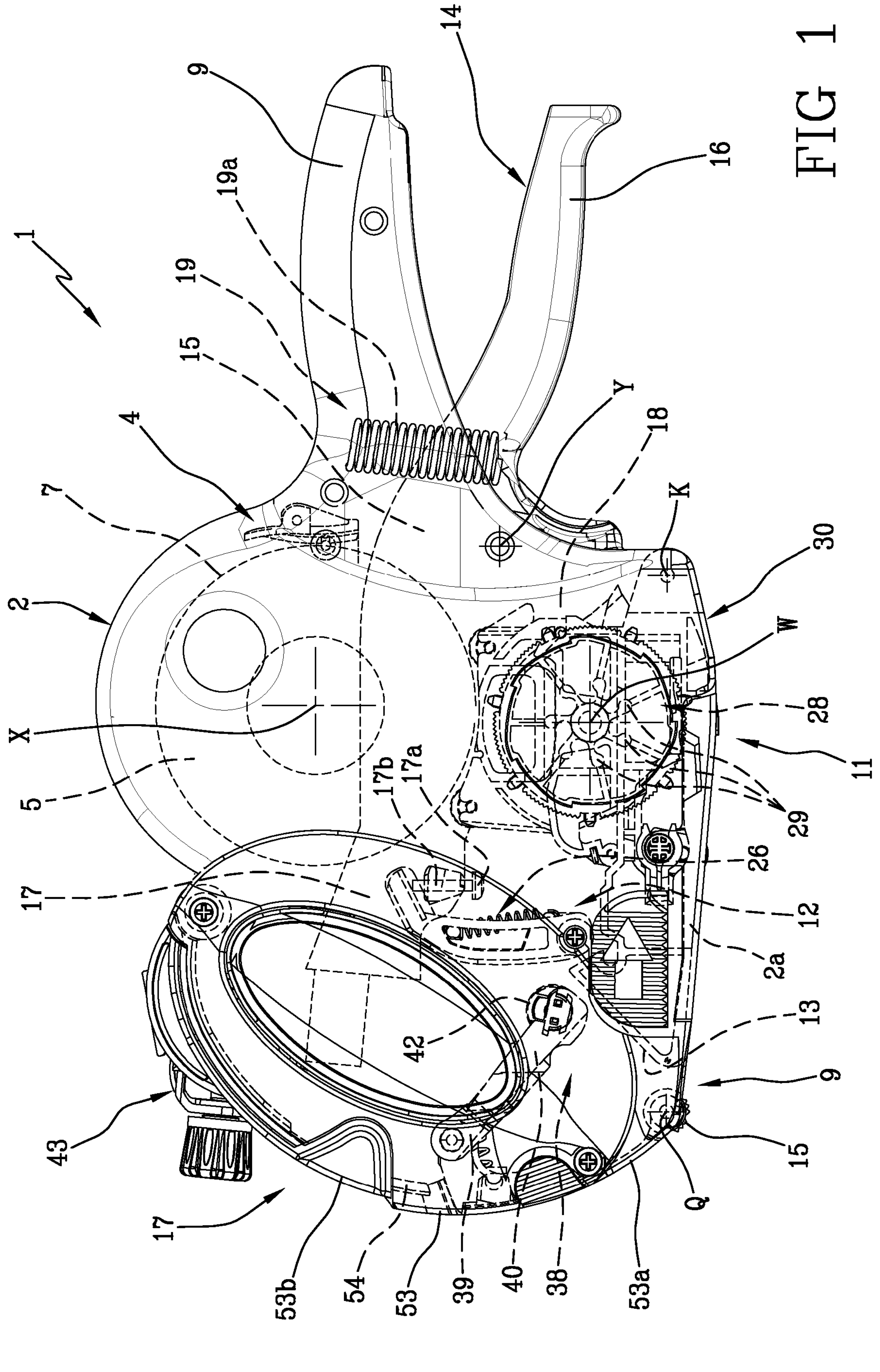
FIG. 1 is a schematic section of a labeling machine according to the present invention.
Figure 2:
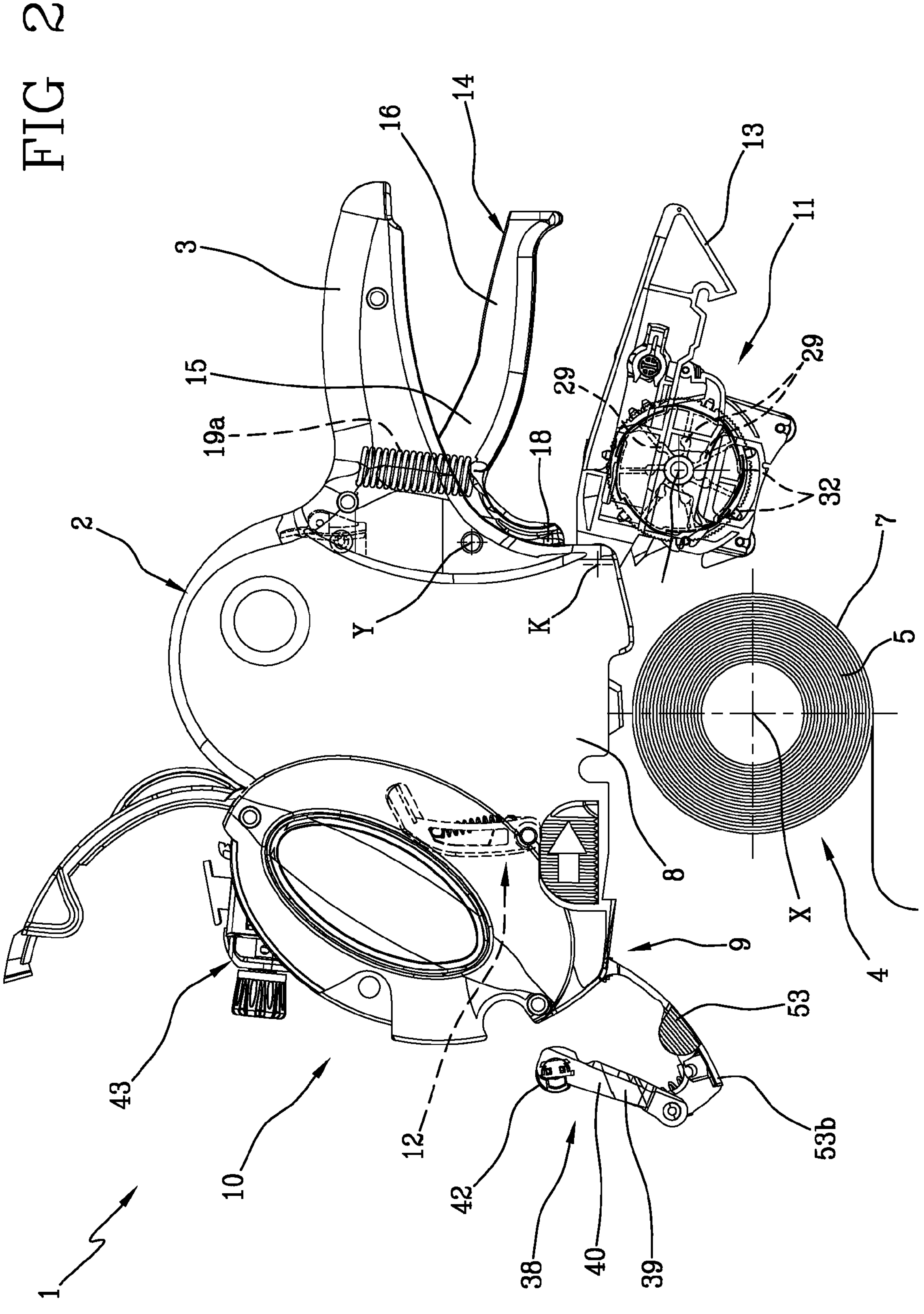
FIG. 2 is an additional schematic section of the labeling machine of the previous Figure, shown in open condition.

As shown in FIGS. 1 and 2, the labeling machine 1 comprises a substantially closed structure 2 presenting a handle 3, positioned posteriorly for the manual engagement of the labeling machine.

Within the structure 2, in a substantially central area, is provided an element 4 for feeding a tape 5 provided with a plurality of labels 6 (whereof one is schematically shown in FIG. 1) to be printed and affixed onto the outer surfaces of corresponding packages, labels and/or products.

As shown in FIGS. 1 and 2, the feeding element 4 preferably comprises a feeding reel 7 pivotally engaged to the structure 2 to rotate around a respective axis of rotation "X".

Advantageously, the feeding reel 7 is removably engaged to the structure 2 in such a way that it can be removed from it when the feeding reel 7 is completely empty.

As shown in FIG. 2, the feeding reel 7 can advantageously be inserted or extracted through an appropriate access opening 8 obtained in a lower part of the structure and appropriately kept closed by additional components of the labeling machine which shall be described below.

To guide the tape 5 at least between the feeding element 4 and an area 9 of application of at least one label 6, the structure 2 is provided with appropriate guidance means which define, according to a predetermined path, a route of advance of said tape 5.

As shown in FIG. 1, the guiding means lead the tape 5 from the feeding element 4 to the application area 9 which is preferably located inferiorly to the structure 2 of the labeling machine 1 in proximity to a front portion 10 thereof.

The labeling machine further comprises at least device 11 for actuating the tape 5 operatively located within the structure 2. The actuating device 11 is movable from a non operative condition in which the tape 5 does not move, remaining in a predetermined position, and operative condition, in which the actuating device 11 induces the tape 5 to move along the path of advance defined by the guiding means to bring at least one label 6 of the tape 5 to the area of application 9.

Again with reference to FIGS. 1 and 2, the labeling machine further comprises an element 12 for arresting the tape 5 operatively positioned within the structure 2. The arresting element 12, not described in detail because it is of a known type, is movable between a condition of arrest, in which it inhibits the actuation of the tape 5 pressing the latter against an abutting surface 13 associated with the structure itself, and a condition of release, in which the pressure of the tape 5 against the abutting surface 13 decreases according to a value such that the tape 5 is free to advance along the aforementioned path of advance.

In order to operate both the actuating device 11 and the arresting element 12, the labeling machine comprises at least one control device 14 operatively associated to the structure 2, preferably inferiorly to the handle 3. The control device 14 is operatively connected to the arresting element 12 and to the actuating device 11 to bring, to the application area 9, at least one label 6 present on the tape 5.

More in particular, the control device 14 comprises a control lever 15 hinged to the structure 2 of the labeling machine 1 in a rear area thereof to oscillate around a respective axis of rotation "Y". The control lever 15 has, inferiorly to the handle 3, a grip portion 16 shaped ergonomically to facilitate and ease the manual grasping thereof. The control lever 15 develops prevalently within the structure 2 presenting a first control portion 17 located in proximity to the arresting element 12 and a second control portion 18 located in proximity to the actuating device 11.

Advantageously, at least one contrasting elastic element 19, preferably a helical spring 19*a*, is operatively interposed between the grip portion of the control device 14 and the handle 3 of the structure 2 to maintain the latter in a predetermined position.

Advantageously, the control device 14 can be moved between a first position in which the arresting element 12 is in arresting condition and the actuating device 11 is in non operative condition (FIG. 1), and a second position in which the arresting element 12 is in release condition and the actuating device 11 is in operative condition, i.e. in condition of pulling the tape 5 that unwinds the respective feeding reel 7.

In greater detail, the movement of the control device 14 from the first to the second position takes place by manually pressing the grip portion 16 of the control lever 15 that consequently rotates around the axis of rotation "Y" counter clockwise. The grip portion 16 approaches the handle 3 pressing the helical spring 19*a* and the respective control portions 17, 18 move determining a change of state relative to the arresting element 12 that reduces its load on the tape 5 and the actuating device 11 that drives the tape 5 along the path of advance.

On the contrary, if the manual action of approach of the grip portion 16 to the handle 3 is interrupted, the control device 14 tends to return to the initial position, i.e. completely removed from the handle 3, rotating clockwise around the axis of rotation "Y".

Figure 3:
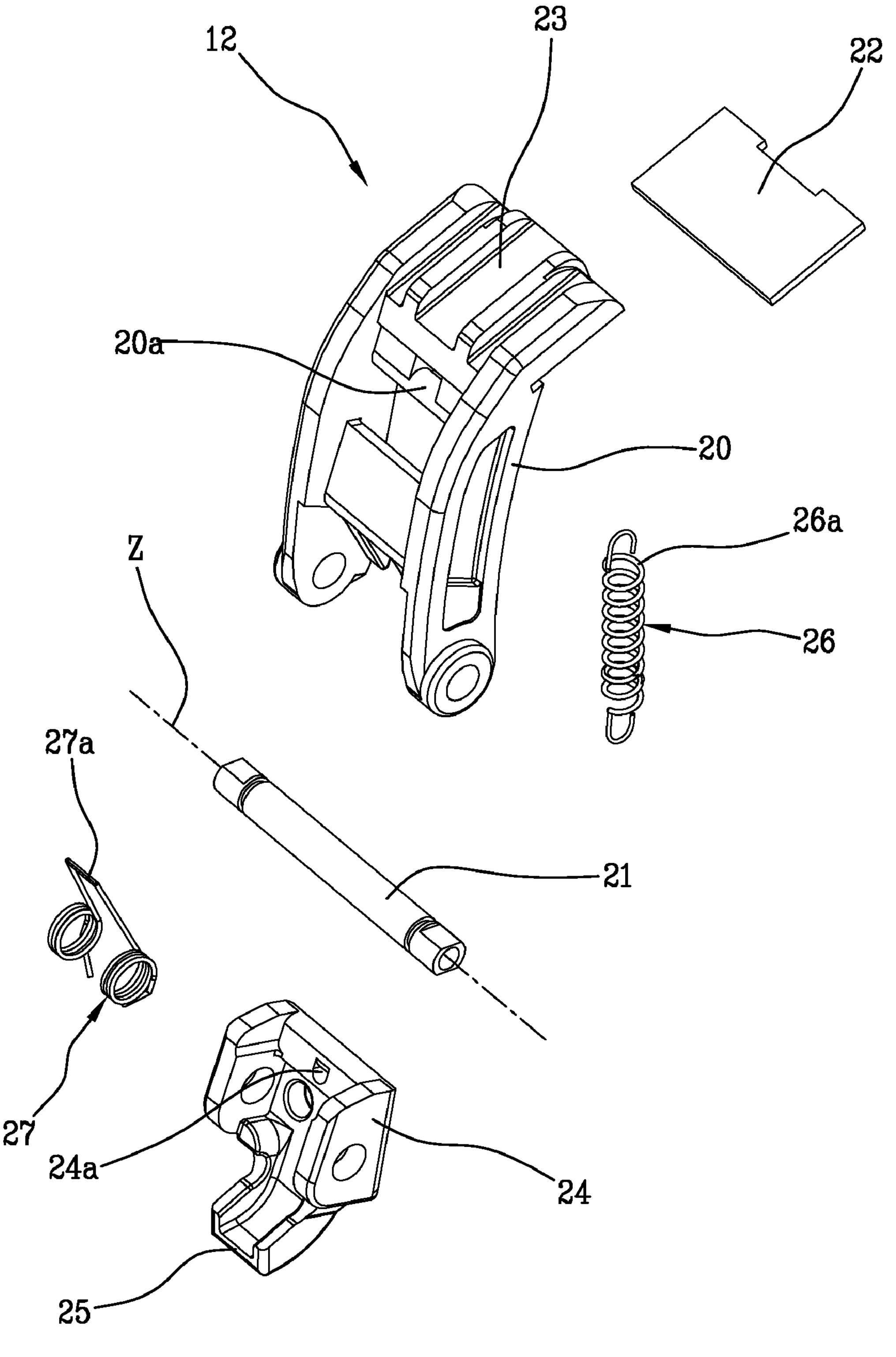
FIG. 3 is a representation of a first detail of the labeling machine of the previous Figures, shown in perspective and in exploded view.
Figure 5:
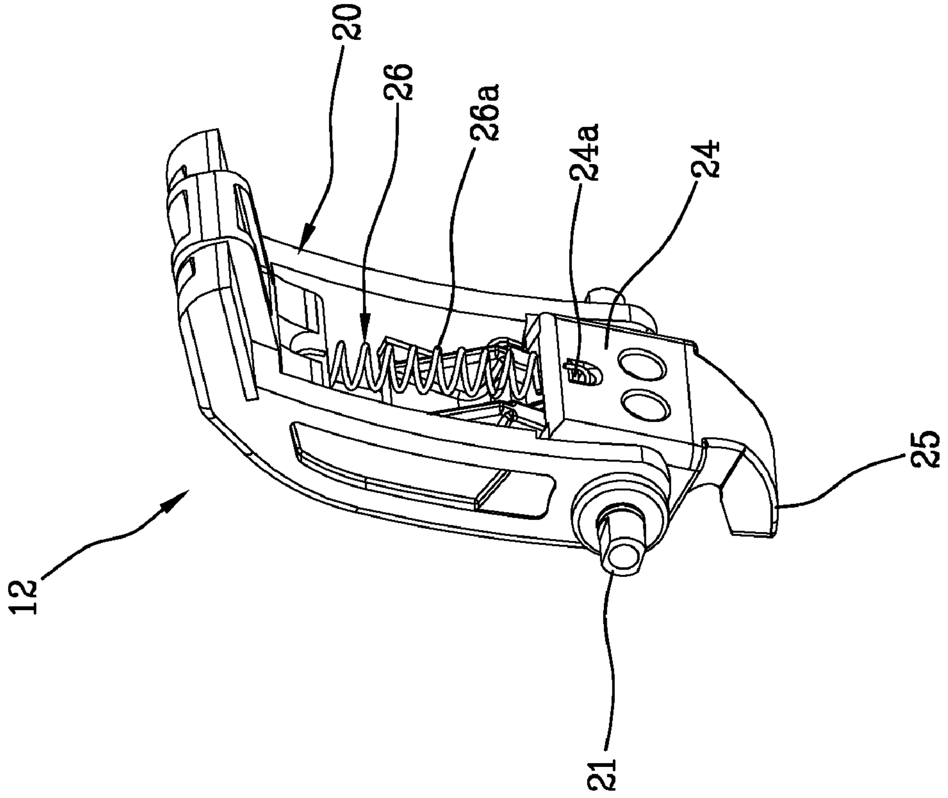
FIG. 5 is a rear perspective view of the detail of FIGS. 3 and 4.
Figure 4:
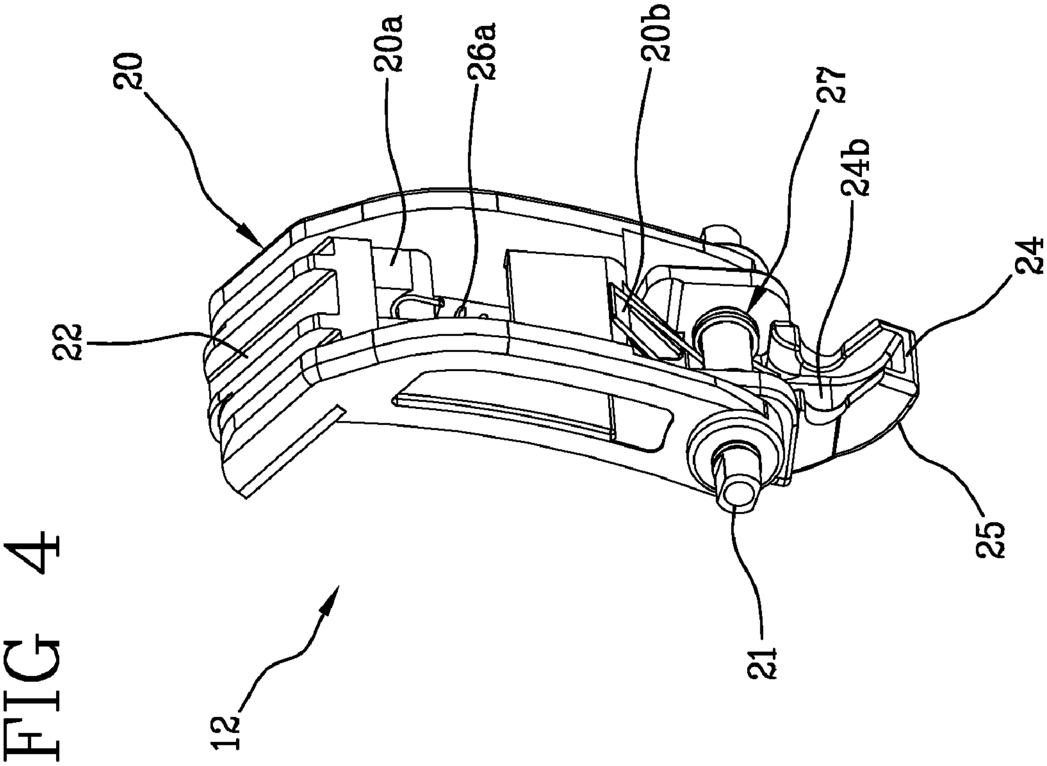
FIG. 4 is a front perspective view of the detail of the previous Figure.

With reference to FIGS. 1-5, and in particular to FIGS. 3-5, the aforementioned arresting device 12 comprises, in detail, a first element 20, preferably made of plastic material, pivotally engaged to the structure 2 by means of a hinging pivot 21 which defines a respective axis of rotation "Z" substantially parallel to the axis of rotation "X" and "Y" respectively of the feeding reel 7 and of the control lever 15. At the opposite site from the hinging pivot 21 the first element 20 has a small engagement plate 22, preferably metallic, engaged, advantageously by co-molding, in a respective seat 23. The engagement plate 22 is operatively connected to the first control portion 17 of the control device 14 so that the movement thereof between the first and the second condition determines the actuation of the arresting device 12 between the arresting condition and the release condition.

Again with reference to FIGS. 3 through 5, the arresting elements 12 comprises a second element 24, preferably metallic, pivotally engaged to the structure 2 by means of the hinging pivot 21 in such a way as to rotate around the axis of rotation "Z". Advantageously, the second element 24 has an inclined portion 25 that engages the tape 5 to block it against the abutting surface 13 when the arresting device 12 is in arresting condition and to allow the advance of the tape itself along the path of advance when the arresting device 12 is in release condition.

The arresting element 12 comprises an elastic connection element 26 interposed between the first and the second element 20, 24 to connect the latter and at the same time to allow relative rotations around the axis of rotation "Z".

The interaction between the elastic connecting member 26, the first and the second element 20, 24, the control device 14 and the tape 5 on the abutting surface 13, determines, in arrest condition, a thrust by the elastic connecting member 26 on the second element 24 against the abutting surface 13. In other words, when the control device 14 is in the first position, the first portion 17 of the control lever 15 pushes the engagement plate 22 of the first element 20 of the arresting member 12 upwards by the action of the contrasting spring 19*a*. In practice, the first control portion 17 of the control lever 15 has a shaped screw 17*a* a shaped stem 17*b* whereof is directly engaged to the engagement plate 22 present in the end of the first element 20 of the arresting member 12 that is opposite to the second element 24.

Being fastened in the pivot 21, the first element 20 tends to rotate counter clockwise (FIGS. 1-3 and 5) tensioning the elastic member 26 which induces the second element 24 in rotation around the axis "Z" and counter clockwise. The rotation of the second element 24 is, however, contrasted by the contrasting surface 13, transforming itself into a thrust equal to the force exercised by the elastic member 26 on the second element 24 and on the contrasting surface 13. Naturally, a push of the tape 5 against the contrasting surface 13 causes its blocking.

On the contrary if the control device 14 is moved from the first to the second position, the first control portion 17 of the control lever 15 no longer pushes against the metallic plate 22, enabling the elastic member 26 to unload, freeing the tape 5 which can thus slide.

Again with reference to FIGS. 3 to 5, the elastic device 26 is preferably constituted by a traction spring 26*a*, operatively interposed between a respective hitching portion 20*a* of the first element 20 and a corresponding engagement portion 24*a* of the second element 24.

The arresting device 12 further comprises an auxiliary elastic member 27, preferably a torsion spring 27*a*, operatively interposed between an abutting portion 20*b* (FIG. 4) of the first element 20 and an abutting surface 24*b* (FIG. 5) of the second element 24, oriented substantially opposite relative to the contrasting surface 13. The auxiliary elastic member 27 cooperates with the elastic members 26 to enhance the thrusting action of the second element 24 against the contrasting surface 13 when the arresting device 12 is in arresting condition and assure the tensioning of the tape 5 when the control device 14 is in the second position in such a way as to obtain the correct detachment of the labels from the tap in the application area 9.

Figure 7:
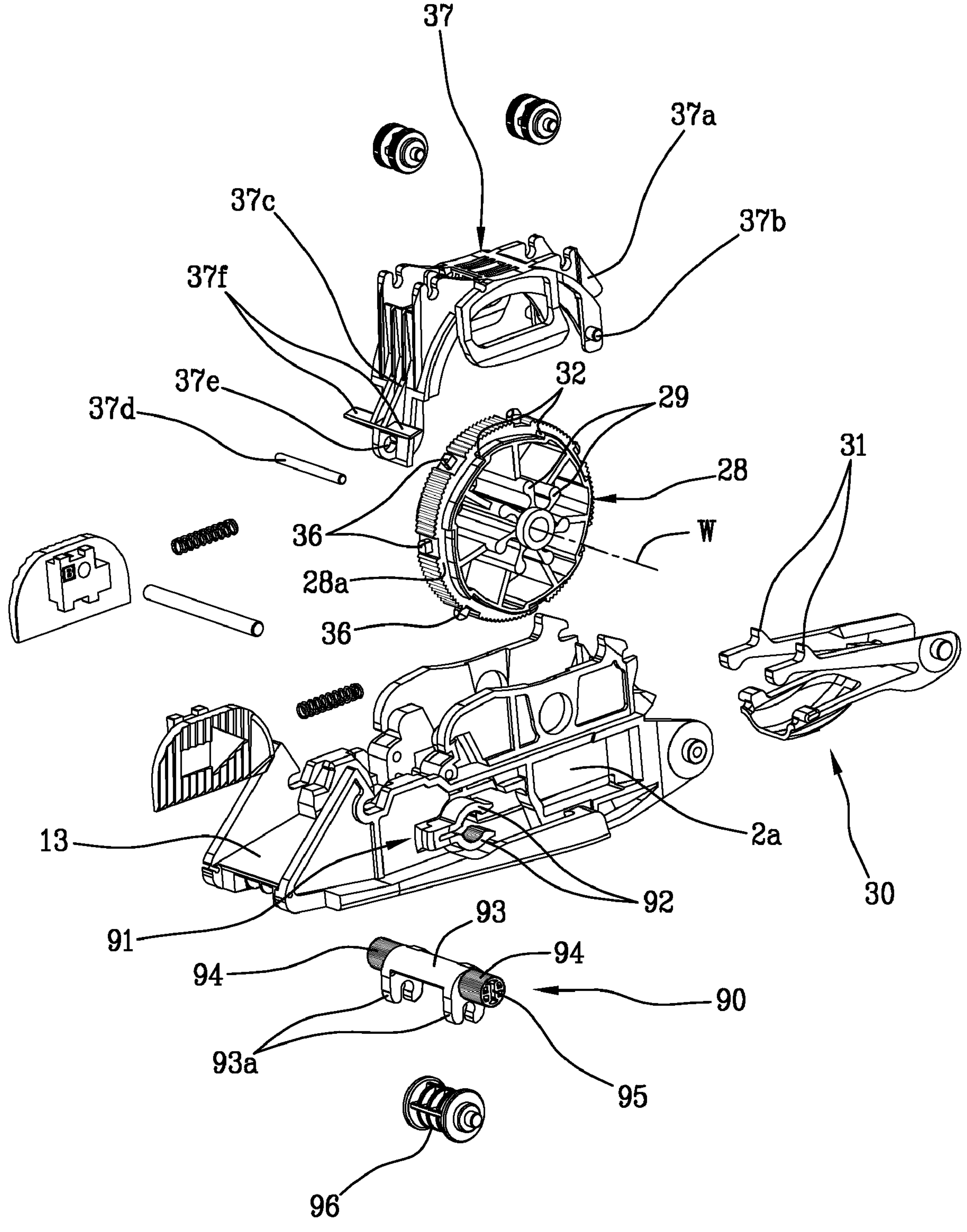
FIG. 7 shows a third detail of the labeling machine, shown in perspective and in exploded view.
Figure 8:
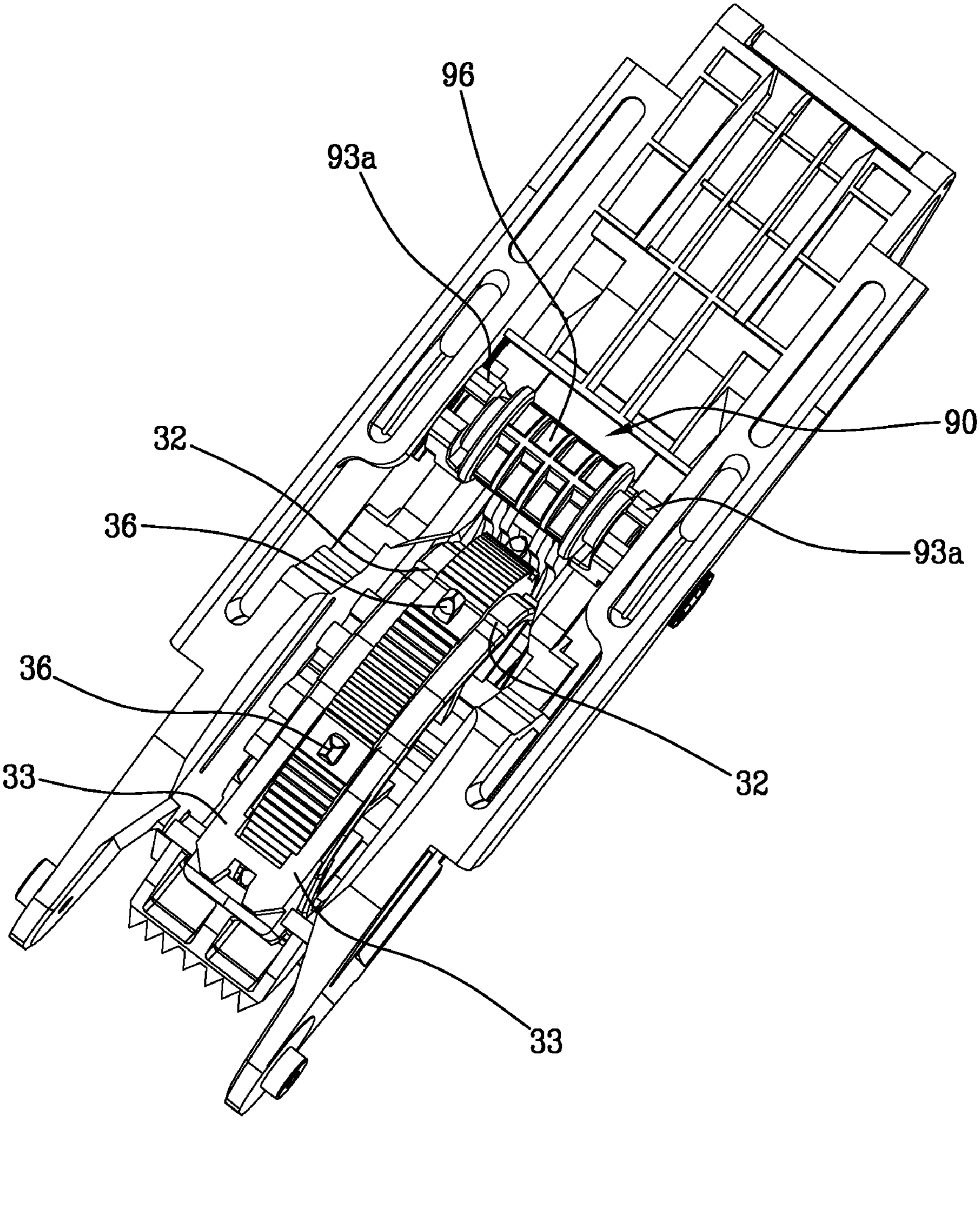
FIG. 8 is a perspective view of a component of the detail of FIG. 7.

With reference to FIGS. 1, 2, and in particular to FIG. 7, the actuating device 11 comprises at least one driving roller 28 pivotally engaged to the structure 2 along the path of advance of said tape 5 and downstream of the area of application 9 of the labels 6. The driving roller 28 partially defines the path of advance of the tape 5 and it can be actuated in rotation according to a predefined angle of rotation to advance the tape 5 according to a respective predetermined measure of advance.

The driving roller 28 is advantageously connected to the control device 14, so that it is actuated in rotation around a respective axis of rotation "W", substantially parallel to the axes of rotation "X", "Y" and "Z" when the arresting member 12 is in release condition.

Describing more in detail the structure of the actuating device 11, the driving roller 28 has a plurality of actuating projections 29 positioned at both the planar lateral surfaces 28*a* thereof, operatively engaged by an actuating member 30 interposed between the driving roller 28 and the second control portion 18 of the control lever 15 of the control device 14. The actuating member 30 operates, on the action of the control device 14, consecutively on each actuating projection 29 to rotate at constant pitch the driving roller 28 around the respective axis of rotation "W" clockwise and according to a predefined angle of rotation.

More in detail, the actuating member 30 is preferably constituted by a pawl 31 hinged at its ends to the structure 2 between the driving roller 28 and the grip portion 16 of the control device 14.

When the control device 14 moves from the second to the first position on the action of the spring 19*a*, the pawl 31 enmeshes the actuating projections 29 of the driving roller 28 obtaining a stepped rotation thereof around the axis "W".

In order to inhibit any counter-rotations of the driving roller 28 during the movement of the control device 14 from the first to the second position, the driving roller 28 is provided with a plurality of locking projections 32.

On the exterior cylindrical surface, the driving roller 28 has a series of notches 36 able to engage inside corresponding slits (not shown) obtained on the tape 5.

Peripherally to the cylindrical surface of the driving roller 28 is provide an elastic tape-guiding device 37 with arched shape which is fastened removably, at its ends to the structure 2 and it is able to maintain the tape 5 pressed on the driving roller 28.

In particular, the elastic tape-guide device 37 has a first end 37*a* hinged to the structure 2, by means of two pins 37*b*, and a second end 37*c*, hinged to the structure 2, by means of a shaft 37*d* that engages within the respective hinging hole 37*e* obtained on the structure of the tape-guide device itself. The tape-guide device 37 is advantageously made elastic by two laminar sections 37*f* that can elasticize so the settling and the phasing of the advance of the tape 5 are assured.

As shown in FIG. 2, both the abutting surface 13 and the actuating device 11 are supported by a portion 2*a* of the structure 2, able to rotate around a hinging axis "K", coinciding with the axis of hinging of the actuating member 30. The displacement of the portion 2*a* of the structure 2, as shown in FIG. 2, defines the aforementioned access opening 8 for the insertion and/or the extraction of the reel 7 for feeding the tape 5.

Figure 9:
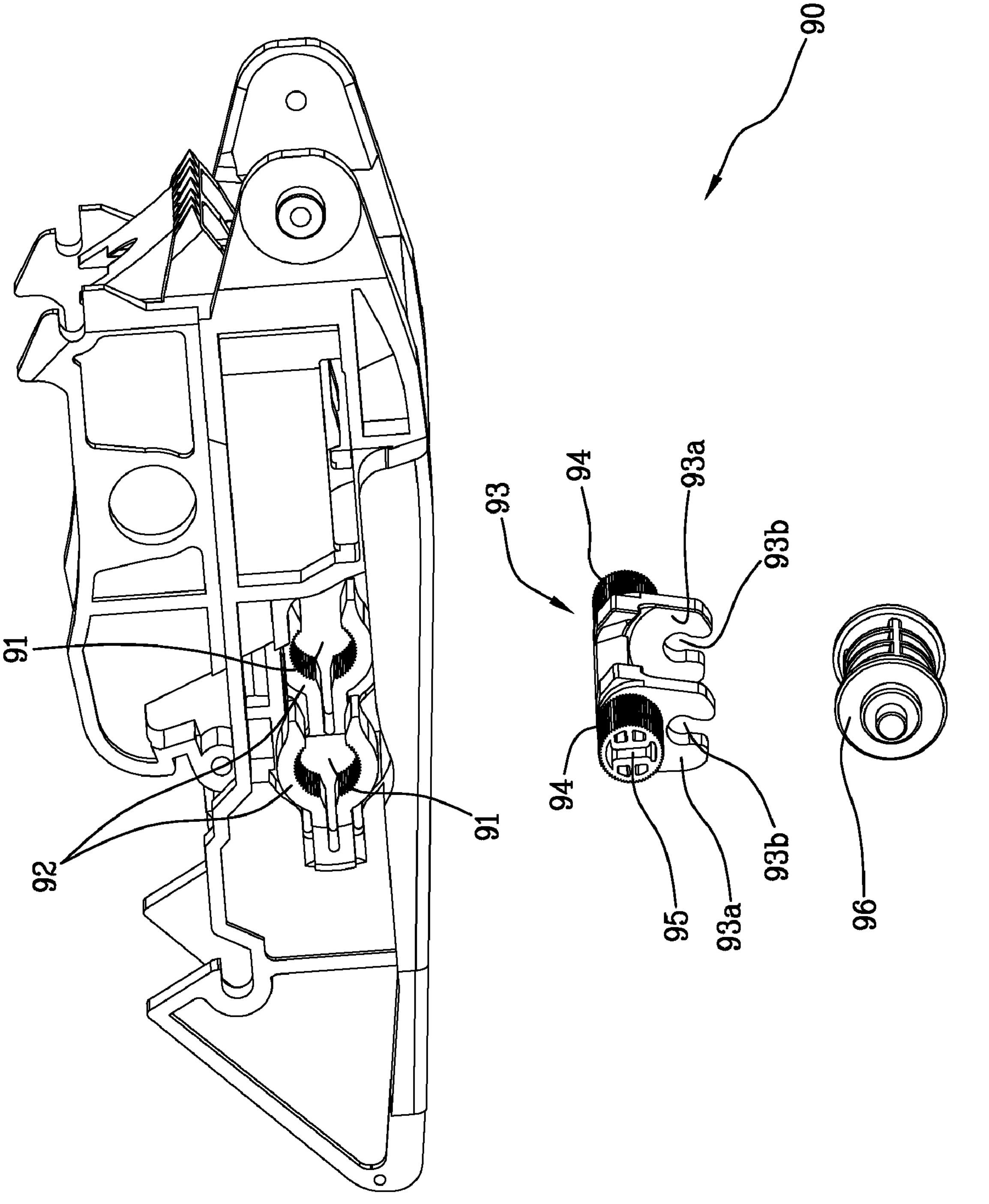
FIG. 9 is a perspective and partially exploded view of a detail of FIG. 7.

Still with reference to FIGS. 7 and 9, it should be noted that the portion 2*a* is also provided with a device 90 for adjusting the position of the tape 5.

In particular, the device 90 presents two housing seats 91, positioned at opposite sides of the aforementioned portion 2*a* and each of them defined by two elastic foils 92 having arched profile. The foils 92 of each seat 91 present respective recessed inner surfaces, facing each other to define a preferably circular housing area.

The foils 92 allow to receive in snap-on fashion, deforming elastically, a support 93 which couples with respective hubs 94 within each seat 91. Hence, each hub 94 presents a shaped surface that is operatively coupled to the corresponding shape of the seat 91, in such a way as to maintain a stable position of the support 93 relative to the structure 2.

As shown in FIGS. 7 and 9, the hubs 94 present a cylindrical development. Moreover, each recessed inner surface of the foils 92 is provided with a parallel notching or knurling, called "paracentric" and preferably constituted by a series of alternated projections with predefined pitch. It should be noted that the hubs 94 also preferably present a parallel notching or knurling, called "paracentric", and preferably constituted by a series of alternated projections with predefined pitch. In this way, the hubs 94 are meshed within the inner surfaces of the foils 92 to maintain a stable coupling of the support 93 within the seats 91.

Advantageously, the snap-on rotation of the support 93 around its own longitudinal axis allows to position the support 93 according to a predefined fixed and adjustable angular position within the seats 91.

It should be noted that the support 93 presents at each hub 94 a recess 95, provided to allow the insertion of the tip of a tool, e.g. a screwdriver. In this way, the operator rotates the support 93 acting directly within the recess 95 with a screwdriver, to select the position of the support 93.

The support 93 further presents two shaped ends 93*a* which, deforming elastically, enable the insertion of a roller 96 around which the tape 5 rotates. Therefore, the rotation of the support 93 determines the positioning of the roller 96 thus obtaining different linear developments to the tape 5. Consequently, manually positioning the roller 96 the position of the tape 5 is varied in accordance with the correct printing position within the label 6, thus compensating any pitch variations present on tapes 5 of different origin.

Figure 6:
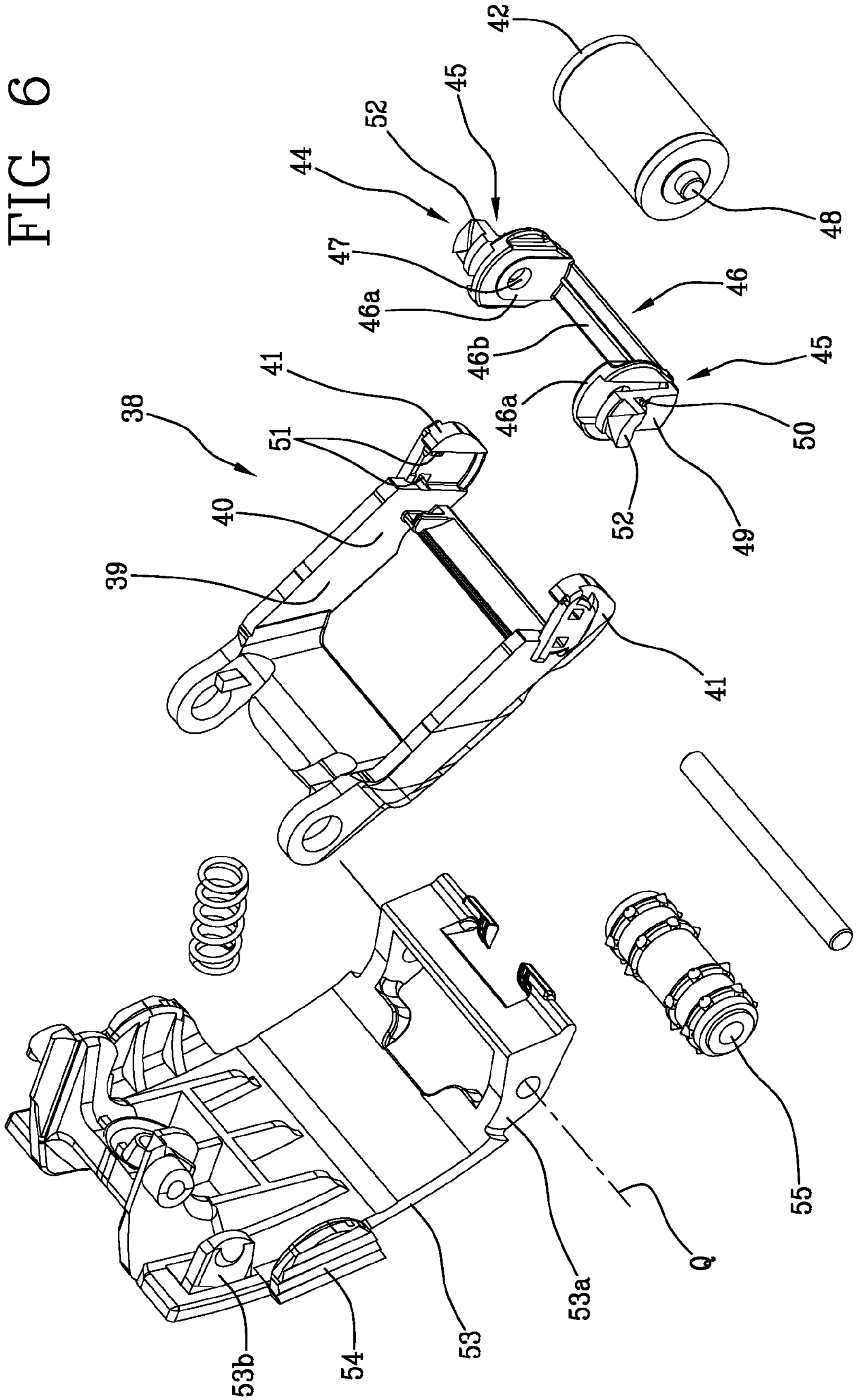
FIG. 6 is a representation of a second detail of the labeling machine of FIGS. 1 and 2, shown in perspective and in exploded view.

Again with reference to FIGS. 1 and 2, and in particular with FIG. 6, the labeling machine 1 comprises a printing device 38 operatively associated to the structure 2 to deposit on at least one label 6 a predefined quantity of ink according to a pre-set motif. The printing device 38 is movable, upon operation of the control device 14, between a condition of rest (FIG. 1) coinciding with the first position of the control device 14 in which the printing member 38 is distanced from the tape 5, and a printing condition coinciding with the second position of the control device 14, in which the printing member 38 operates on a respective label of the tape 5.

Advantageously, the printing member 38 comprises at least one support element or support arm 39 operatively associated to the structure 2 and having a free end 40 preferably provided with two support projections 41. The printing member 38 further comprises at least one inking roller 42 removably engaged to the support element 39 between the support projections 41.

As visible in FIGS. 1 and 2, the printing member 38 is also provided with means for feeding the ink 43 to be provided to the inking roller 42 which are only mentioned here because they do not represent the subject of the present invention.

Advantageously, the printing member 38 comprises at least one engagement device 44 (FIG. 6) able to be operatively interposed between the support element 39 and the inking roller 42 to allow, integrally with the inking roller 42, the removable engagement thereof to the support element 39. In other words, the engagement device 44 enables the inking roller 42 to be engaged or removed from the support element 39 within coming in contact with the cylindrical surface of the inking roller 42.

Preferably, the engagement device 44 has snap-in engagement means 45 for the engagement of the inking roller 42 to the support element 39.

With reference again to FIG. 6, the engagement device 44 comprises a substantially "U" shaped roller-holder structure 46 having two lateral portions 46*a*, each provided with a respective seat 47 for the pivotal engagement of a respective longitudinal pivot 48 of the inking roller 42 and a central connecting portion 46*b* interposed between the lateral portions 46*a*.

The engagement device 44 further comprises two elastic connecting elements 49 each operatively engaged externally to a respective lateral portion 46*a* of the roller-holder structure 46. Each elastic connecting element 49 is movable between a first position in which it is distanced from the respective lateral portion 46*a* of the roller-holder structure 46 and a second position in which it is approached to the respective lateral portion 46*a* of the roller-holder structure 46.

Each elastic connecting element 49 has, at opposite side relative to the respective lateral portion 46*a* of the roller-holder structure 46 at least one hitching projection 50, adapted to engage at least one respective hitching seat 51 obtained internally in a respective support projection 41 of the support element 39 and at least one thrust edge 52 through which the hitching projection 50 is displaced from the first to the second position, engaging the respective hitching seat 51 when the roller-holder structure 46 is engaged between the support projections 41 of the support element 39.

As shown in FIGS. 1, 2 and 6, the labeling machine advantageously comprises at least one door 53 having a first end 53*a* hinged to the structure 2 and a second end 53*b*, opposite the first end 53*a*, provided with at least one element 54 for locking the door 53 on the structure. The door 53 is able to rotate around a hinging axis "Q", defined in the first end 53*a*, between a closed position (FIG. 1) in which the structure 2 is closed by the door 53, and an open position (FIG. 2), in which the door 53 is at least partially removed from the structure 2.

Advantageously, the support element 39 of the inking roller 42 is hinged, at the opposite side from its free end 40, to the second end 53*b* of the door 53. According to said connection, the support element 39 is positioned within the structure 2 when the door 53 is in closed position and it is positioned at least partially, preferably completely (FIG. 2) outside the structure 2 when the door 53 is in open position to facilitate accessibility to the inking roller 42.

As shown in FIG. 6, at the axis of hinging "Q" is also pivotally engaged an application roller 55 by means of which it is possible to press the label exiting the corresponding application area against an underlying surface.

The present invention solves the problems observed in the prior art and achieves the proposed objects.

First of all, the adjusting device 90 is easy to use and it allows manually to adjust the position of the tape 5 manually relative to the printing element 38.

Said advantage is given by the presence of the support 93 which laterally presents the recess 95 whereby the operator can intervene modifying the positioning of the roller 96.

Consequently, the lateral position of the recess 95 is easily accessible and it enables to rotate the support 93 without acting on the tape 5 thus avoiding damaging the tape 5.

The adjusting device 90 is therefore easy to use and at the same time able to assure the correct positioning of the labels relative to the printing element.

It should also be considered that, in the illustrated example, the knurled surfaces enable to position the support 93 stably and precisely within the aforesaid seats 91.

Advantageously, the roller 96 also is positioned correctly increasing/reducing the distance between the roller 96 itself and the application area 9, to correct the position of the labels 6 relative to the printing element.

What is claimed is:

1. A labeling machine comprising:

a structure;

at least one member for feeding a tape provided with a plurality of labels associated to said structure;

guiding means associated to said structure to drive said tape at least between said feeding member and an area, defined in said structure, for the application of at least one label, said guiding means defining a path of advance of said tape;

at least one device for actuating said tape positioned in said structure, said actuating device being movable between a non operative condition in which said tape remains in a predetermined position, and an operative condition, in which said actuating device induces in actuation said tape along said path of advance to bring at least one label of said tape to said area of application; and a printing device operatively associated to said structure to deposit on at least one label borne by said tape a predefined quantity of ink, according to a pre-set motif; wherein, a regulating device for regulating the path of advance of the tape, the regulating device comprising a driving roller, the driving roller actuated in rotation to adjust a position of the tape to vary a printing position of each label of the tape.

2. A labeling machine as claimed in claim 1, wherein, said driving roller is pivotally engaged, at a support, to the structure along the path of advance of the tape, the driving roller actuated in the rotation according to a predefined angle of rotation to advance the tape according to a respective predetermined measure of advance.

3. A labeling machine as claimed in claim 2, characterized in that said support of the driving roller rotates according to fixed angular positions, adjustable in progressive steps.

4. A labeling machine as claimed in claim 3, characterized in that said support presents contoured ends, elastically deformable, able to allow, at respective seats, the insertion of the driving roller.

5. A labeling machine as claimed in claim 2, characterized in that said support presents a recess obtained in respective hubs; each recess being positioned in a lateral visible area of said structure.

6. A labeling machine as claimed in claim 5, characterized in that each hub has cylindrical development.

7. A labeling machine as claimed claim 6, further comprising cylindrical ends, wherein each cylindrical end presents a contoured surface operatively coupled to a matching contour of a seat obtained in the structure to maintain a stable position of the support relative to the structure.

8. A labeling machine as claimed claim 7, characterized in that each hub presents a notched surface meshed in a respective seat obtained in the structure to maintain a stable position of the support relative to the structure.

9. A labeling machine as claimed in claim 8, characterized in that said seats are positioned at opposite parts of the structure and each of which is defined by two elastic foils able to house a respective hub in snap-in fashion.

10. A labeling machine as claimed claim 7, characterized in that said seats are positioned at opposite parts of the structure and each of which is defined by two elastic foils able to house a respective hub in snap-in fashion.

11. A labeling machine as claimed in claim 10, characterized in that said elastic foils have an arched profile.

12. A labeling machine as claimed in claim 11, characterized in that each foil of each seat presents respective recessed inner surfaces, facing each other to define a circular area for housing the hub; said inner surfaces of the foils presenting a notching operatively coupled to the notching obtained on the outer surface of a respective hub.

13. A labeling machine as claimed in claim 6, characterized in that said recess presents a shape able to receive the tip of a screwdriver of a user to rotate in steps said support around its longitudinal axis.

14. A labeling machine as claimed claim 5, characterized in that said recess presents a shape able to receive the tip of a screwdriver of a user to rotate in steps said support around its longitudinal axis.

15. A labeling machine as claimed in claim 14, further comprising cylindrical ends, wherein each cylindrical end presents a contoured surface operatively coupled to a matching contour of a seat obtained in the structure to maintain a stable position of the support relative to the structure.

16. A labeling machine as claimed in claim 2, characterized in that said support presents contoured ends, elastically deformable, able to allow, at respective seats, the insertion of the driving roller.

17. A labeling machine as claimed claim 1, characterized in that said support presents contoured ends, elastically deformable, able to allow, at respective seats, the insertion of the driving roller.

18. A labeling machine comprising:

a structure (2) with a handle (3) and an area of label application (9), the handle positioned posteriorly for the manual engagement of the labeling machine;

a feeding element (4) for feeding a tape (5) provided with a plurality of labels (6), the feeding element located within the structure, the feeding element (4) comprising a removable feeding reel (7) pivotally engaged to the structure (2) to rotate around a respective first axis of rotation (X);

a guiding element associated to the structure to guide a path of advance of the tape (5) between the feeding element (4) and the area of label application (9);

an actuating device (11) for actuating the tape (5) operatively located within the structure (2), the actuating device (11) movable from i) a non-operative condition in which the tape (5) does not move, remaining in a predetermined position, and ii) an operative condition, in which the actuating device (11) induces the tape (5) to move along the path of advance to bring one label (6) of the tape (5) to the area of label application (9); and a printing device (38) operatively associated to said structure to deposit on the one label a predefined quantity of ink, according to a pre-set motif, wherein, the actuating device (11) comprising a regulating device for regulating the path of advance of the tape, the regulating device comprising a driving roller (28) actuated in rotation according to a predefined angle of rotation to advance the tape (5) according to a respective predetermined measure of advance to adjust a position of the tape (5) to vary a printing position of each label of the tape.

19. A labeling machine as claimed in claim 18, wherein said driving roller pivotally engaged to the structure (2), via a support (93), along the path of advance of the tape (5) and downstream of the area of label application (9), the driving roller (28) partially defining the path of advance of the tape (5).

20. A labeling machine as claimed in claim 19, wherein the support rotates according to fixed angular positions, adjustable in progressive steps.

* * * * *